United States Patent

[11] 3,634,825

[72] Inventor Mark W. Levi
128 Arlington Rd., Utica, N.Y. 13501

[21] Appl. No. 842,519
[22] Filed July 17, 1969
[45] Patented Jan. 11, 1972
Original application June 24, 1968, Ser. No. 739,235, now Patent No. 3,513,365, dated May 19, 1970. Divided and this application July 17, 1969, Ser. No. 842,519

[54] FIELD EFFECT INTEGRATED CIRCUIT AND METHOD OF FABRICATION
14 Claims, 4 Drawing Figs.

[52] U.S. Cl. 340/166 FE, 307/251, 340/173
[51] Int. Cl. G11c 5/02, G11c 7/00, G11c 11/40
[50] Field of Search 340/166, 173; 307/251; 317/235

[56] References Cited

UNITED STATES PATENTS

| | | | |
|---|---|---|---|
| 3,395,290 | 7/1968 | Farina et al. | 307/251 X |
| 3,510,849 | 5/1970 | Igarashi | 340/173 |
| 3,521,081 | 7/1970 | Vasseur et al. | 307/251 X |
| 3,521,242 | 7/1970 | Katz | 340/173 |

*Primary Examiner*—Donald J. Yusko
*Attorneys*—Harry A. Herbert, Jr. and Julian L. Siegel

ABSTRACT: An integrated circuit operating at about 77° K. having first and second field effect transistors, a digital terminal being connected to the source of each transistor and capacitively coupled to the drain of the first transistor and the gate of the second transistor. A first read terminal is connected to the drain of the second transistor and capacitively coupled to the drain of the first transistor while a second read terminal is capacitively coupled to the drain of the first transistor. The method of fabrication makes use of stray capacitance in the laying of the layers.

INVENTOR.
MARK W. LEVI
BY Harry A. Herbert Jr. and Julian L. Siegel
ATTORNEYS

INVENTOR
MARK W. LEVI
BY Harry A. Herbert Jr
and
Julian L. Siegel
ATTORNEYS

FIELD EFFECT INTEGRATED CIRCUIT AND METHOD OF FABRICATION

CROSS REFERENCES TO RELATED APPLICATION

This present application is a division of my copending application filed June 24, 1968, Ser. No. 739,235, now issued U.S. Pat. No. 3,513,365, dated May 19, 1970, wherein A FIELD-EFFECT INTEGRATED CIRCUIT AND METHOD OF FABRICATION was disclosed.

BACKGROUND OF THE INVENTION

This invention relates to field effect transistors and more particularly to an integrated circuit that can be used either as a cross-point, as a switch, or as a memory call.

The present invention solves the problem of making high multiple cross-point switches, large associative memories, and large cheap memories. The efficient utilization of the stray capacitances within the integrated circuit cell provides simplified operation and minimizes the space occupied by the cell. The specific design of the cell permits placement within a small space, such as a 10×10 micron square. Such cells are adapted for production in the form of arrays.

SUMMARY OF THE INVENTION

The integrated circuit or cell can be used in any or all of four ways: as a cross-point, as a switch (for multiplexing, for example), as a memory cell, and/or as an associative memory cell.

A method of operation of the above-mentioned cells in large arrays are fully utilized by using the stray capacitance. The use of such cells below 200° K. makes them reliable and practical.

The efficient utilization of the stray capacitance within the cell provides a simplified operation and minimizes the space occupied by the cell. The invention can be used in constructing communications gear of small size and low weight and can provide cheap, fast, random access memories.

It is, therefore, an object of the invention to provide novel integrated circuits.

It is, another object to provide novel field effect transistor circuits.

It is another object to provide arrays of field effect transistor circuits usable as cross-points, switches, and memories.

It is still another object to provide an integrated circuit including field effect transistors.

It is still another object to provide novel structures for integrated field effect transistor circuits.

It is still another object to provide unique methods for the operation of field effect transistor circuits.

These and other advantages, features and objects of the invention will become more apparent from the following description taken in connection with the illustrative embodiment in the accompanying drawings, wherein:

DESCRIPTION OF THE PREFERRED EMBODIMENTS

Figure 1:
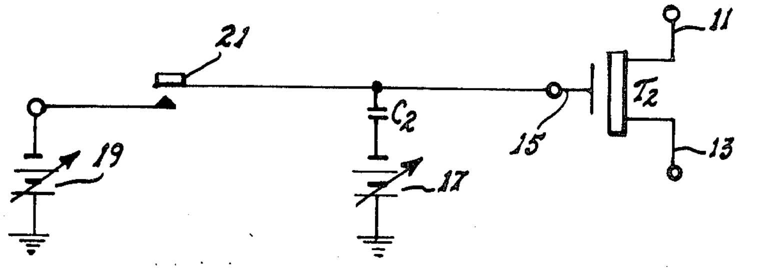
FIG. 1 is a circuit diagram showing a basic concept of the invention.

Referring to FIG. 1, there is shown a circuit diagram of a basic embodiment of the invention. Field effect transistor $T_2$ has two terminals 11 and 13 in which current can be controlled by application of a voltage or charge to gate control terminal 15. One terminal of capacitor $C_2$ is connected to terminal 15, the other to controlled voltage-driving source 17. Capacitor $C_2$ can be charged by controlled voltage-driving source 19 through switch 21 which connects the driving source 19 when closed and isolates the charge when open. Terminals 11 and 13 can then be reversibly controlled by capacitive coupling of source 17 to terminal 15 through capacitor $C_2$. The character of the control will be determined by the charge previously deposited, the voltage of source 17, and the gate control voltage which is required to cause $T_2$ to conduct between terminals 11 and 13.

Figure 2:
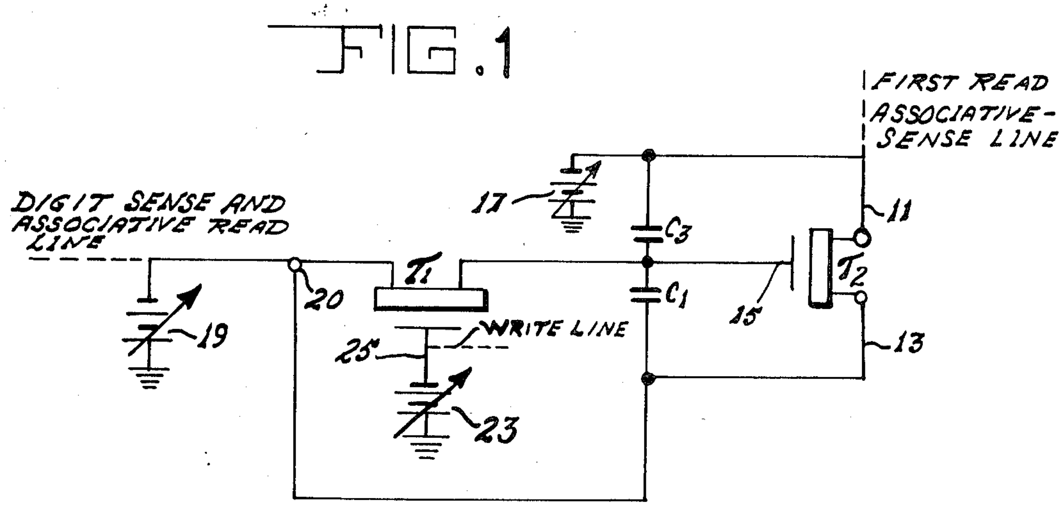
FIG. 2 is a circuit diagram showing a first embodiment of the invention.

Referring to FIG. 2, there is shown an embodiment where switch 21 has been replaced by field effect transistor $T_1$ and controlled voltage-driving source 23. The first read associative sense line is connected to terminal 11 of transistor $T_2$ and the digit sense associative read line is connected to terminal 20 of transistor $T_1$. The write line is connected to gate control terminal 25 of transistor $T_1$.

Figure 3:
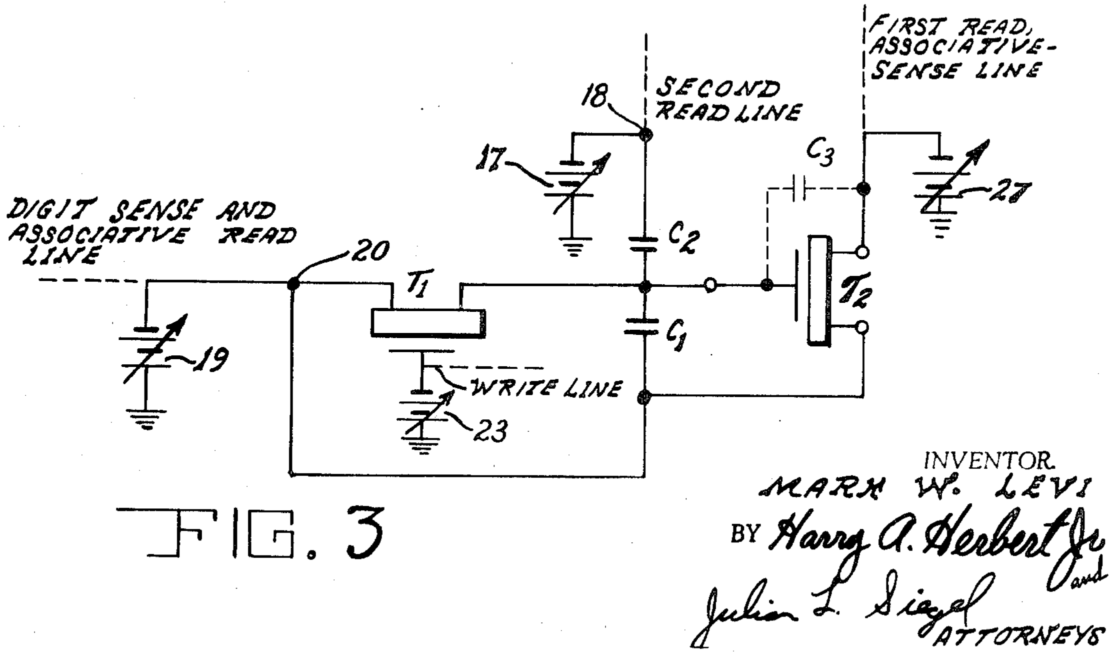
FIG. 3 is a circuit diagram of a second embodiment of the invention having an isolated associative sense terminal.

In FIG. 3 there is shown a circuit modified to give an isolated associative terminal. Controlled voltage-driving source 27 is connected to terminal 11 and a second read line is connected to terminal 18. In FIG. 3, $C_3$ is shown in dotted lines which represents the stray capacitance between the juncture of $C_1$, $C_2$, and the gate of $T_2$ and the drain of $T_2$ or terminal 11, whereas in FIG. 2, $C_3$ is shown in solid lines which represents both the stray capacitance together with the capacitance from read line 2 of FIG. 4.

FIGS. 1 to 3 show circuits for single cells which can belong to a large array of cells. Within such an array, write, first and second reads of a cell would be common connections to a row of cells. The digit terminal would be common to an intersecting column of cells within the same N-type, In order that there be a usable fraction of the available time of a large array of such cells, it is necessary that the leakage period exceed 1 second, and it is preferable to have it much longer. Since $C_1$ plus $C_2$ plus $C_3$ will be at most $10^{14}$ farads (in a cell small enough to put $10^7$ cells on one silicon slice), the required leakage resistance is at least $10^{14}$ ohms, and preferably much larger. The chief source of leakage is the drain to source leakage of transistor $T_1$. The state of the art is such that this resistance will not exceed $10^{12}$ ohms at room temperature, but by operating the cell below 200° K., a resistance in excess of $10^{15}$ ohms can be obtained, thus making the small cell practically operable.

Figure 4:
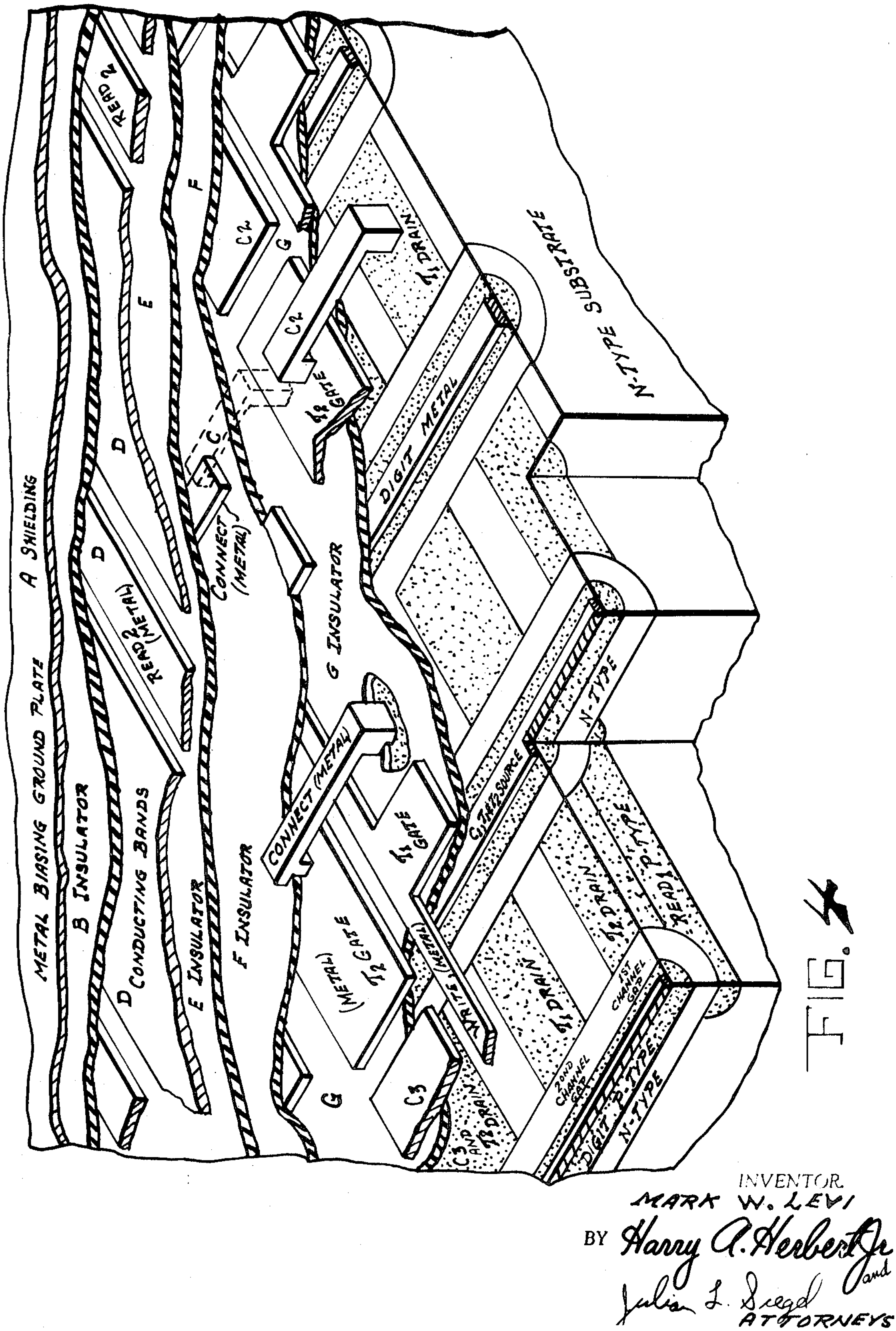
FIG. 4 is an isometric drawing of an array of field effect transistor circuits.

In FIG. 4 there is shown an array of the cells as shown in FIGS. 2 and 3 for indicating the steps of fabrication. The invention is described using particular polarities of semiconductor materials but it is understood that these polarities can be reversed; that is, P-type semiconductor material could be changed to N-type, and vice versa.

P-type semiconductor material is used for 1 drain of transistor $T_2$ and the read 1 terminal. A mask is first applied and windows in the mask for these drain areas are opened after an initial diffusion of the read 1 line, and the read 1 line is allowed to diffuse deeper. The mask is then removed and the next mask is prepared. The digit line is prepared by N-type isolation diffusion made to such a depth that transistor $T_1$ drain area is isolated, but the read 1 line area retains a P-type connection beneath the digit isolation diffusion. At this point no mask change is made. A P-type diffusion is made to form the isolated P-type digit line. A metal strip is plated onto the digit line to improve its conductivity. The metal is not as wide as the P-type digit line since diffusion proceeds under the mask whereas the plating does not. The mask is then stripped off and the gate insulator layer G is deposited.

A metal pattern is deposited either additively or subtractively for the gate of transistor $T_1$ and write lines, respectively. The overlap of the gate of transistor $T_1$ provides capacitor $C_1$ and capacitor $C_3$. A hole is then opened in the gate oxide to expose the P-type region which is the drain of transistor $T_1$. A layer of insulator F is then deposited. Two holes are opened in the insulator and connecting metal is deposited either additively or subtractively in order to connect the gate of transistor $T_2$ to the drain of transistor $T_1$. Another layer of insulator E is then deposited. A metal pattern D is then deposited either additively or subtractively. Of this pattern, the read 2 line provides the second plate of a portion of capacitor $C_2$ (the gate of transistor $T_2$ provides the first plate). The remainder of the pattern is a ground plane which is to be biased electrically in such a way as to prevent field effect transistor action between cells. Another layer of insulator B is deposited and a metal biasing ground plane A electrically connected to the first ground plane.

It is to be understood that it is the structure which is the basis of the invention rather than the particular steps used in the fabrication. The structure can be divided into two portions: (a) the semiconductor structure, and (b) the overlying insulator and conductor structure.

The first semiconductor structure consists of: (a) buried P-type strips which are periodically connected to the surface by P-type plugs. These form what is shown in FIG. 4 as "Read 1 P-type" and "$T_2$ Drain." The plugs are aligned so as to permit: (b) digit P-type strips to be on the surface (in a direction perpendicular to the direction of the buried strips and isolated from them). These digit strips serve two functions: they form the digit line (or associative read), they are also the sources of both $T_1$ and $T_2$. (c) Isolated plugs in the surface, one paired with each $T_2$ drain. These plugs are the $T_1$ drains. Between the digit P-type strips and the $T_1$ and $T_2$ drains are respectively the first and second channel gaps.

A second semiconductor structure can be obtained by having a buried layer rather than buried strips. The layer contacts only the $T_2$ drain plugs. This semiconductor structure cannot be used in the associative memory mode, but it should provide faster ordinary memory by virtue of the lower resistance of the buried layer as compared to that of a buried strip.

In both semiconductor structures the "digit metal" in FIG. 4 can be included or not. If included the array will be faster due to the lowered digit line resistance; if not included the construction would be easier.

The overlying conductor (metal) and insulator structures can be varied in several ways. The structure, as shown in FIG. 4, corresponds to an array of circuits as in FIG. 3, although a FIG. 2 circuit could be simulated with an external connection of read 1 to read 2.

A first modification which does not alter the circuit is the substitution of the connecting link C (as shown by the dotted lines in FIG. 4) for the "connect (metal)." This provides a different but equivalent pairing of $T_1$ and $T_2$ transistors. This change has both advantages and disadvantages. An advantage is that crossovers are eliminated between "write (metal)" and "connect(metal), thus making layer F of insulator unnecessary. The disadvantage is that the "connect (metal)" is no longer shielded from the semiconductor surface, and the G insulator must be thickened to prevent self-induced conduction in $T_1$ (from $T_1$ drain to $T_2$ drain).

A second alteration can be performed on either the original or first altered overlying structures. It consists of removing layers A and B and having layer D continuous. This changes the circuit to that in FIG. 2.

A third alteration can be performed on any of the second altered overlying structures and consists of removing layer D (or layer D and E). This reduces the storage capacitance of each cell and eliminates shielding (disadvantages) but has the advantage of reducing the number of layers of metallization.

Any of the alterations of the overlying structure can be used over the first semiconductor structure, but only the original and first modified overlying structures are suitable for use on the second semiconductor structure. "Removing" in all cases merely means "not putting on in the first place."

With all constructions, cells are of such a form that minimal surface area is required per cell in the sense that the area per cell is not appreciable larger than is required for the access connections alone. With state of the art construction techniques (the ability to make masks with 0.6-micron width holes such cells can easily be constructed in a 10×10 micron size. Maximum utilization is made of the surface area by embodying the capacitors $C_1$, much of $C_2$, and $C_3$as the stray capacitances between the metal gate of transistor $T_2$ and the digit, read 2, and read 1lines.

The operation of the invention is explained as follows:

Information is stored in the form of a real charge on the $T_2$ gate capacitance. The charge is introduced by applying a voltage to the digit terminal while simultaneously applying a voltage to the write terminal so as to cause transistor $T_1$ to conduct. Subsequent application to the write terminal of a voltage causes transistor $T_1$ to become nonconductive and traps the charge on capacitors $C_3$, $C_2$, and $C_1$. Subsequent change of the digit voltage to some other value does not change the real charge on the gate, although it does change the gate potential. In other words, the digit voltage has been stored, but may be reversibly added to by capacitive coupling of voltages on any of the lines digit, read 2, or read 1. The various modes of operation of the cell are obtained by appropriately choosing the real charge to the stored and subsequent applications of voltages to the digit, read 2, and read 1 lines. Sensing circuits must also be present on these same lines, and the impedance to ground of some lines must be controlled. It is assumed that the resting potential of the digit lines is 0 volts. Resting potential of the read 1 lines can be some small voltage. Resting potential of the read 2 line should be well toward the cutoff voltage of the transistors in order to prevent sneak paths; otherwise, the DC value is irrelevant.

When operating as an ordinary memory cell, the choice of real charge on the gate of transistor $T_2$ is cut off when all lines (except, of course, write) are at resting potential.

If read 2 is then changed to a voltage such as to capacitively couple onto the gate of transistor $T_2$ a voltage of magnitude and sign such that it drives transistor $T_2$ into conduction only if the value initially present on the gate of transistor $T_2$ was that closer to the conduction level than for such cells, the voltage on read 1 will be connected to the corresponding digit line. To illustrate, assume that for a P-channel enhancement mode device, conduction occurs only if the voltage on the gate is more negative than −3 volts. Hence, the two values chosen as possibilities for the real charge would be such as to leave either −2.0 or 0.0 volts on the gate of transistor $T_2$ under resting conditions. A negative voltage change applied to read 2 of sufficient magnitude to couple −2.0 volts (additional) onto the gate of transistor $T_2$ will cause transistor $T_2$ to conduct from drain to source only if −2.0 volts was originally present. For such a condition on transistor $T_2$, the small voltage on the read 1 line will be connected to the corresponding digit line and can be sensed there. The small voltage on read 1 would preferably be about −0.5 volts. This would give a good signal, but could not cause conduction in other cells along the same digit line. Although a small positive voltage could be used, it would run the risk of forward biasing the isolating junction of the digit line. The cells along a read 2 line would constitute a "word" in the 2D memory. The memory could be operated in a 2½D mode by dividing each word (which might contain 3,000 or more bits) into several shorter words for access via a smaller number of external lines than 3,000.

In operation as an associative memory, storage of information is precisely as in the operation of an ordinary memory cell, except that the information is complemented and duplicated. Two cells in a word are used for each bit, one for the bit, and one for its complement. If a match is sought on this bit, one of the digit lines is brought to a voltage such that it couples −2.0 volts onto the gates of the $T_2$ transistors along that digit line. The digit line of the pair is chosen such that a match of the bit will not cause conduction of transistor $T_2$ (i.e. the stored value would be 0.0 volts). Any mismatch will cause conduction of a $T_2$ transistor, thus connecting a digital voltage of −2.0 or more volts onto the read 1 line of the word containing the mismatch. This can operate a detector which flags the unmatched word.

Operation as a cross-point or switch is similar to that of the memory cell and associative memory cell modes except that the values for the real charge on the gates of $T_2$ transistors are chosen from two values, one of which permits continuous conduction through transistor $T_2$, the other completely preventing conduction through transistor $T_2$. Analog (or low-voltage digital) signals can then be conducted via $T_2$ transistors among various digit lines and/or read 1 lines.

In operation as a sample and hold multiplexer, analog signals introduced on digit lines or read 1 lines are sampled onto other digit lines or read lines by pulsing read 2 lines while real charges of the type used for the ordinary memory cells are already introduced on appropriate $T_2$ transistors' gates. In all preceding modes, low- or moderate-impedance line terminations are most useful on all lines, so as to reduce the time that capacitive through-coupling persists. In this mode, high-impedance terminations are used on those lines which are to be outputs, so that the line capacitance will act as a hold capacitor. The switch operation would be done by read 2 lines, since they are nowhere direct coupled to the digit or write 1 lines. The order of switching can be remembered by using the appropriate arrangement of cells containing a real charge of the half select value (−2.0 volts in our example) and sequencing the read 2 lines. If this is done, conference connections of any number or size are possible.

Since large overlaps of conductors are designed onto these cells, construction tolerances are relatively loose compared to the usual enhancement mode field effect transistor in which precise alignment of gate metal with the channel is necessary in order to optimize operation.

Although the invention has been described with reference to particular embodiments, it will be understood to those skilled in the art that the invention is capable of a variety of alternative embodiments within the spirit and scope of the appended claims.

I claim:

1. An electrical circuit wherein the temperature is maintained below 200° K. comprising:

a. a first field effect transistor having first and second controlled terminals and a controlling third terminal, the third terminal requiring a negligible current for operation;

b. a first controlled voltage-driving source;

c. a first capacitor having first and second terminals, the first terminal being connected to the controlling terminal of the first field effect transistor and a second terminal being connected to the first controlled voltage-driving source;

d. a second controlled voltage-driving source having a fourth terminal; and e. means including a second field effect transistor for connecting and disconnecting the controlling terminal of the first field effect transistor to the fourth terminal.

2. An electrical circuit comprising:

a. a first field effect transistor having first and second controlled terminals and a controlling third terminal, the third terminal requiring a negligible current for operation;

b. a first controlled voltage-driving source;

c. a first capacitor having first and second terminals, the first terminal being connected to the controlling terminal of the first field effect transistor and a second terminal being connected to the first controlled voltage-driving source;

d. a second controlling voltage-driving source having a fourth terminal connected to the second controlled terminal of the first field effect transistor; and e. means including a second field effect transistor for connecting and disconnecting the controlling terminal of the first field effect transistor to the fourth terminal.

3. An electrical circuit according to claim 2 wherein the second terminal of the first capacitor is connected to the first controlled terminal.

4. An electrical circuit according to claim 2 which further comprises a third controlled voltage source connected to the first controlled terminal.

5. An electrical circuit according to claim 6 which further comprises a second capacitor connected between the fourth terminal and the first terminal of the first capacitor.

6. An electrical circuit according to claim 7 which further comprises a second capacitor connected between the fourth terminal and the first terminal of the first capacitor.

7. A method of controlling a voltage-controlled element wherein the element requires negligible current from the controlling terminal having a capacitance the method comprising:

a. charging the capacitance of the controlling terminal;

b. isolating the charge on the capacitance of the controlling terminal thereby controlling the controllable element; and c. reversing the polarity of the voltage on the controlling terminal via capacitive coupling for further controlling of the controllable element without altering the charge of the capacitance.

8. A method of controlling a voltage-controlled element according to claim 7 by further maintaining the temperature at less than 200° K.

9. A method of controlling a voltage-controlled element according to claim 7 wherein the altering of the voltage of the controlling element is via a plurality of capacitive couplings.

10. A method of controlling a voltage-controlled element according to claim 9 by further maintaining the temperature at less than 200° K.

11. A monolithic integrated array of electrical circuits having columns and rows of circuits according to claim 3 wherein:

a. the second terminals of the first capacitors of the circuits of each column of the array are connected in common, forming a first read line;

b. the fourth terminals of each row of the array are connected in common, the common connection being a digit and sense line; and c. the gates of the first transistor of each column of the array are connected in common, the common connection being a write line.

12. A monolithic integrated array of electrical circuits having columns and rows of circuits according to claim 4 wherein:

a. the first controlled terminals of the second transistors of each column are connected in common to form a first read line;

b. the fourth terminals of each row of the array are connected in common, the common connection being a digit and sense line; and c. the second terminals of the first capacitors of each column are connected in common to form a second read line; and d. the gates of the first transistor of each column are connected in common, the common connection being a write line.

13. A monolithic integrated array of electrical circuits having columns and rows of circuits according to claim 5 wherein:

a. the second terminals of the first capacitors of the circuits of each column are connected in common forming a first read associative sense line;

b. the fourth terminals of each row of the array are connected in common, the common connection being a digit and sense and associative read line; and c. the gates of the first transistor of each column of the array are connected in common, the common connection being a write line.

14. A monolithic integrated array of electrical circuits having columns and rows of circuits according to claim 6 wherein:

a. the first controlled terminals of the second transistors of each column are connected in common to form a first read and associative sense line;

b. the fourth terminals of each row of the array are connected in common, the common connection being a digit and sense and associative read line; and c. the second terminals of the first capacitors of each column are connected in common to form a second read line; and d. the gates of the first transistors of each column are connected in common, the common connection being a write line.

* * * * *

UNITED STATES PATENT OFFICE
CERTIFICATE OF CORRECTION

Patent No. 3,634,825 Dated January 11, 1972

Inventor(s) Mark W. Levi

It is certified that error appears in the above-identified patent and that said Letters Patent are hereby corrected as shown below:

Claim 5, change "6" to -- 3 --.

Claim 6, change "7" to -- 4 --.

Signed and sealed this 29th day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334